United States Patent [19]

Schlunke et al.

[11] Patent Number: 5,477,838
[45] Date of Patent: Dec. 26, 1995

[54] SUPERCHARGED ENGINES

[75] Inventors: Christopher K. Schlunke, Kingsley; Gregory B. Bell, Woodlands, both of Australia

[73] Assignee: Orbital Engine Company (Australia) Pty Limited, Balcatta, Australia

[21] Appl. No.: 246,922

[22] Filed: May 20, 1994

Related U.S. Application Data

[63] Continuation of Ser. No. 743,315, filed as PCT/AU90/00081, Feb. 27, 1990, abandoned.

[30] Foreign Application Priority Data

Feb. 27, 1989 [AU] Australia ................................. PJ2970

[51] Int. Cl.⁶ ..................................................... F02B 33/40
[52] U.S. Cl. ................................. 123/559.1; 123/65 BA; 123/65 P
[58] Field of Search ............................ 123/559.1, 65 B, 123/65 BA, 65 P

[56] References Cited

U.S. PATENT DOCUMENTS

| 1,340,229 | 5/1920 | Jeffries | 123/65 BA |
|---|---|---|---|
| 2,057,062 | 10/1936 | Schneider | 123/65 BA |
| 2,110,754 | 3/1938 | Alston | 123/65 BA |
| 4,638,770 | 1/1987 | Fox | 123/65 P |

FOREIGN PATENT DOCUMENTS

| 206129 | 7/1955 | Australia. | |
|---|---|---|---|
| 875899 | 7/1942 | France | 123/65 BA |
| 542242 | 1/1932 | Germany | 123/559.1 |
| 743417 | 12/1943 | Germany. | |
| 879626 | 6/1953 | Germany. | |
| 905688 | 3/1954 | Germany. | |
| 517269 | 2/1955 | Italy | 123/65 BA |
| 247183 | 2/1926 | United Kingdom. | |
| 322570 | 12/1929 | United Kingdom. | |
| 349423 | 5/1931 | United Kingdom | 123/65 P |
| 356456 | 9/1931 | United Kingdom. | |
| 1161742 | 8/1969 | United Kingdom. | |
| 2808138 | 8/1979 | United Kingdom | 123/65 BA |

*Primary Examiner*—Michael Koczo
*Attorney, Agent, or Firm*—Nikaido, Marmelstein, Murray & Oram

[57] ABSTRACT

A multi-cylinder two-stroke cycle engine according to the invention incorporates a plurality of cylinders (1,2,3) arranged in line with each cylinder having at least two inlet ports one on each of the two opposite longitudinal sides of the in-line cylinders (1,2,3). Air passages (67,77) extend along said opposite sides to supply air from a supercharger (not shown) to the respective inlet ports. An air control valve (68) is operable to selectively control air supply to one or both of said air passages (67,77) whereby optimum combustion conditions are obtained for various engine load/speed conditions. A centrifugal supercharger arrangement is also disclosed, the supercharger being coupled to the engine crankshaft and interposed between the cylinder block and the engine flywheel.

21 Claims, 5 Drawing Sheets

SUPERCHARGED ENGINES

This application is a continuation of application Ser. No. 07/743,315 filed as PCT/AU90/00081, Feb. 27, 1990, now abandoned.

This invention relates to engines to be operated with a supercharger and maybe applied to engines operating on either the two stroke or four stroke cycle.

There is currently a trend towards the use of supercharged engines in vehicles, particularly in engines of automobiles, and the majority of these employ a turbo-charger, that is a centrifugal compressor driven by a turbine through which the hot exhaust gases from the engine are expanded. Although the performance of turbo-chargers is acceptable, there are problems associated with their use, including the space they occupy in the engine compartment, the heat radiated from the turbine section within the engine compartment, and the relatively high level of servicing required by turbo-chargers. Also there is a time lag in the response of a turbo-charger to increasing power demands on the engine, particularly when increasing in low to medium speed range.

However, as the customer demand increases for greater performance from small displacement engines, it is evident that an effective supercharged engine is desirable.

The object of the present invention is to provide an engine and supercharger assembly which substantially reduces the above disadvantages and is effective in operation and relatively simple and cost effective in manufacture.

With this stated object in view, there is provided, by one aspect of the present invention a multi-cylinder internal combustion engine having a cylinder block, a crankshaft having a longitudinal axis and supported in the cylinder block for rotation about said longitudinal axis, a plurality of cylinders in said cylinder block arranged in one or more banks, each bank having a plurality of inline cylinders, a piston supported to reciprocate in each cylinder, each piston being coupled to the crankshaft to effect rotation of the crankshaft in response to reciprocation of the pistons, each cylinder in at least one cylinder bank having at least two inlet ports, one on each of the two opposite longitudinal sides of the respective bank of cylinders, an air passage extending along at least one bank of cylinders and communicating with inlet ports on each cylinder of the cylinder bank on each of the two opposite sides of the cylinder bank, the air passage of the or each cylinder bank being arranged to receive air from a supercharger, and air control means operable in relation to at least one air passage receiving air from the supercharger to selectively supply or vary the rate of the supply of air to the inlet ports on one or both sides of the cylinders of that cylinder bank.

With another aspect of the present invention in view there is provided a multi-cylinder internal combustion engine having a cylinder block, a crankshaft having a longitudinal axis and supported in the cylinder block for rotation about said longitudinal axis, a plurality of cylinders in said cylinder block arranged in one or more cylinder banks, each cylinder bank having a plurality of inline cylinders, a piston supported to reciprocate in each cylinder, each piston being coupled to the crankshaft to effect rotation of the crankshaft in response to reciprocation of the pistons, a centrifugal supercharger located adjacent one end or the cylinder block co-axial with the crankshaft, said compressor having a stationery housing non-rotatably secured to the cylinder block and an impeller co-axially drive coupled to the crankshaft.

Conveniently the supercharger is located between the cylinder block and a flywheel mounted on the crankshaft preferably with at least part of the housing of the centrifugal supercharger is formed integral with the cylinder block or a component of the engine such as the crankcase or oil sump, or an adaptor or mounting plate that is attached to the cylinder block to facilitate mounting of a transmission assembly to the engine.

In yet another aspect of the invention there is provided a multi-cylinder supercharged two stroke cycle internal combustion engine having a cylinder block, a crankshaft having a longitudinal axis and supported in the cylinder block for rotation about said longitudinal axis, a plurality of cylinders in said cylinder block arranged in an inline formation, a piston supported to reciprocate in each cylinder, each piston being coupled to the crankshaft to effect rotation of the crank in response to reciprocation of the pistons, each cylinder having at least two peripherally spaced inlet ports in the wall of the cylinder cyclically opened and closed by the piston reciprocating in the cylinder, at least one inlet port of each of two adjacent cylinders being located in an opposing relation and each communicating with a portion of a single transfer passage interposed between said opposing inlet ports, whereby air from the supercharger can be supplied to said two cylinders through the respective opposing inlet ports from said single transfer passage, the timing of the opening and closing of the opposing inlet ports by the reciprocation of the pistons in the adjacent cylinders being arranged so that only one of said opposing ports is in communication with the single transfer port at any one time.

Preferably an air delivery port and/or an air inlet port of the compressor is also formed integral with the compressor housing.

Where the engine is one that operates on the two stroke cycle, and has inlet ports formed in the wall of some or all of the cylinders of the engine it is preferable that a conduit is provided in the cylinder block to communicate between the air delivery port of the compressor housing and at least some of the inlet ports. Where more than one inlet port is provided for each cylinder, with inlet ports on each of the two generally opposite sides of the cylinder block or bank, a single conduit may be provided along one side of the cylinders with passages extending therefrom, within the cylinder block, to the inlet ports on the other side thereof. Alternatively, respective conduits may be provided along each side of the cylinder bank to communicate with the inlet ports on the respective sides thereof.

In an engine having two banks of cylinders arranged in a V formation, one conduit may be provided in the valley between the two banks, to provide air to ports in the cylinders on either side of the valley, and respective conduits on the outer side of each bank to provide air to further ports on the outer side of the cylinders.

Where a conduit is providing air to two or more side by side cylinders of a multi-cylinder engine, a single passage may communicate ports of adjacent cylinder to the conduit. This arrangement will permit a reduction in the spacing between the cylinders and improvement in the air flow into the cylinders.

Provision may be made to control the flow rates in the respective conduits to achieve a desired distribution of the air between the ports on the respective sides of the cylinder bank. The control provision may be adapted to enable the air distribution to be varied with engine load and/or speed, and may be part of an ECU controlled engine management system.

The supercharger is preferably of the centrifugal type and is preferably located at that end of the engine at which the crankshaft is coupled to the transmission device that delivers the torque of the engine to the equipment to be driven. The centrifugal supercharger may be located at the flywheel end of the cylinder block and is located between the flywheel and the cylinder block, where it may be conveniently located in or at least in part incorporated into the housing normally provided to enclose the flywheel and commonly referred to as the bell housing.

Provision may be made to effect cooling of the supercharger by providing coolant circulating passages within the housing which communicate with the coolant system of the cylinder block. Preferably provision is made especially to cool the high pressure air delivered from the to contribute to the more efficient operation of the engine.

The impeller of the supercharger may be coupled to the crankshaft of the engine to rotate at the same speed as the crankshaft, or alternatively a suitable speed step-up transmission may be provided therebetween. The transmission mechanism may be of the epicyclic traction type, for example of the friction ball type epicyclic drive.

The invention will be more readily understood from the following description of one form of engine having the supercharger incorporated therein as illustrated in the accompanying drawings.

Figure 2:
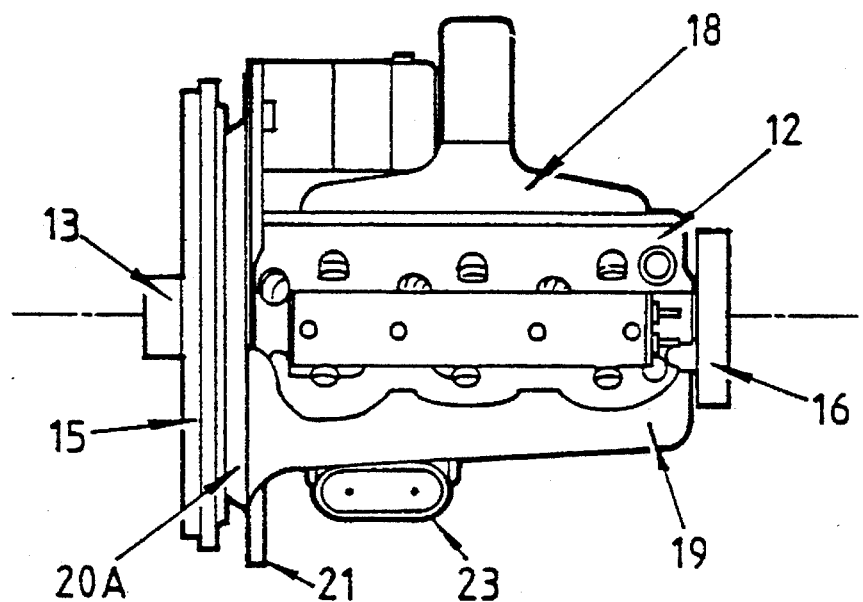
FIG. 2 is a plan view from above.

Referring now to the drawings, the engine illustrated is of a three cylinder inline single bank configuration operating on the two stroke cycle. The cylinder block 11 has three cylinders formed therein closed at the top by the cylinder head 12. A crankshaft 13 is journalled in bearings provided at the lower end of the block 11 with the lower end of the block being closed by the crankcase 14. The crankshaft 13 carries a flywheel 15 at the rear end and a pulley 16 at the forward end for driving the various engine accessories, such as alternator and water circulation pump (not shown).

The exhaust manifold 18 is attached to one side of the cylinder block 11 to communicate with three exhaust ports provided in the block 11 communicating with the respective cylinders of the engine. On the opposite side of the cylinder block 11 to the exhaust manifold 18 is an air plenum chamber 19 that communicates with respective inlet ports provided in the cylinder block to communicate with each of the three cylinders.

Figure 3:
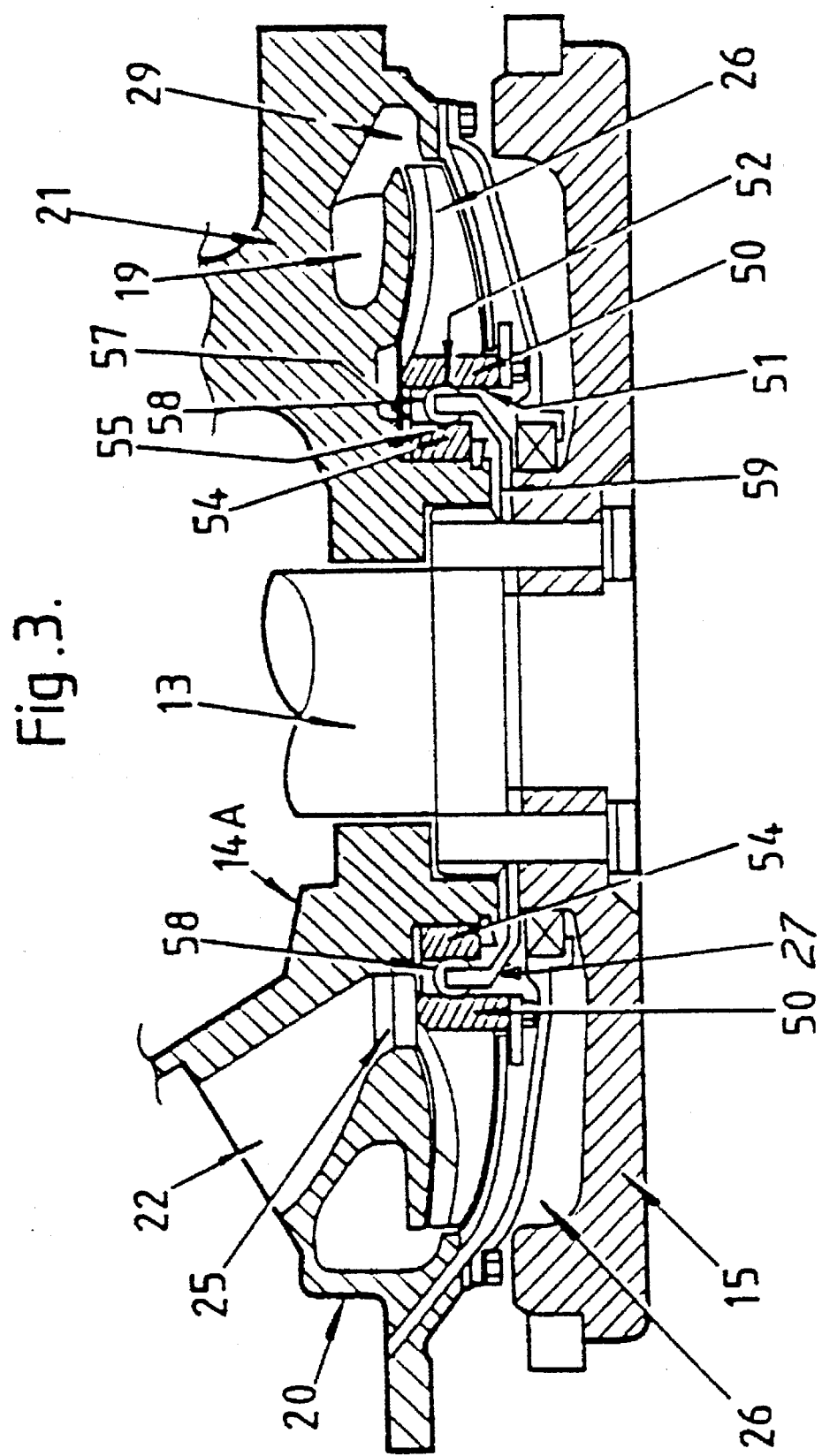
FIG. 3 is a sectional view through the rear portion of the cylinder block and the supercharger.

At the rear of the engine, the scroll type housing 20 of a centrifugal supercharger is formed in part integral with the cylinder block 11, but may be part of an adaptor plate 21 which is secured to the cylinder block 11. As seen in FIG. 3, the supercharger scroll housing extends in an arcuate form below the rear portion 14a of the crankcase 14 and includes a forward projecting portion 22 which co-operates with the air inlet tube 23.

The forward projecting portion 22 communicates with the interior of the scroll housing 20 at 25 located radially inward of the periphery of the impeller 26 as is conventional in a centrifugal type pump compressor. Internally of the scroll housing 20 the impeller 26 is mounted to rotate concentrically with respect to the crankshaft 13 and is driven thereby through an epicyclic traction type transmission 27 to provide the required speed differential between the engine, crankshaft and the impeller.

The spiral high pressure cavity 28 formed in the scroll housing 20 communicates at 29 with the air duct 19 that leads to a plenum chamber 61 (FIG. 4) to distribute the air from the supercharger to the respective cylinders of the engine.

As can be seen the disposition of the centrifugal supercharger incorporated into the rear portion of the engine block provides an extremely compact construction whereby the provision of the supercharger does not substantially increase the overall longitudinal dimensions of the engine. Also there is a minimal amount of external ducting or piping required to deliver the air to the supercharger and to deliver the air from the supercharger to the respective engine cylinders.

Figure 6:
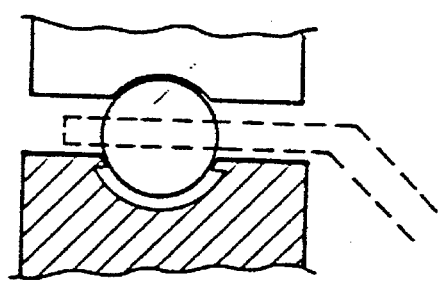
FIG. 6 is a diagram relating to the supercharger drive.

As can be seen in FIGS. 3 and 6, the impeller 26 of the supercharger is arranged with a central hub 50 having an internal surface 51 with a concentric annular recess 52 of arcuate cross-section. A cylindrical sleeve 54 is non-rotatably mounted on the extension 56 of the cylinder block co-axial with the crankshaft 13. The external cylindrical surface 57 of the sleeve 54 has a concentric annular recess 55 of arcuate cross-section. When both the sleeve 54 and the impeller hub 50 are co-axially mounted, a plurality of steel balls 58 are interposed therebetween seated in the respective annular recesses 52 and 55. The balls 58 are mounted in a carrier 59 attached to the flywheel 15 and crankshaft 13 to rotate therewith. The carrier 59 has a plurality of apertures therein to locate the balls 58 in a equally spaced configuration about the axis of the crankshaft in a manner similar to that used in ball bearings.

The frictional load between the balls 58 and the surface of the respective annular recesses 52 and 55 is sufficient so that, as the crankshaft and the carrier 59 rotate, the balls 58 will rotate on their respective axes parallel to the axis of the crankshaft and so roll along the surface of the recess 55 in the sleeve 54. The rotation of the balls 58 on their axes transmits a rotational movement to the hub 50 of the impeller 26 to rotate the impeller on its axis, which corresponds to the crankshaft axis, at a rotational speed greater than the crankshaft rotational speed.

In the known constructions of the above type of epicyclic friction ball transmission, the recesses 52 and 55 are of spherical segmental cross-section of a diameter slightly greater than that of the balls so that the balls 58 contact the surfaces of the recess substantially in the diametral plane of the balls radial to the crankshaft axis. Thus with the carrier 59 engaging the balls at the mid diameter between the diameters of the contact between the balls and the impeller 26 and the contact between the balls and the sleeve 54, there is achieved a speed step-up ratio between the crankshaft and the impeller of approximately 2:1.

However, it has been found that if the recess 55 in the sleeve 54 is shaped to bring the line of contact closer to the line of contact of the balls with the carrier 59, then the step-up ratio can be increased substantially above 2:1. This can be achieved by forming the recess in the sleeve 54 with an undercut cross-section as shown in FIG. 6 so the radial distance A from the axis B of the ball 58 to the line of contact C with the recess 55 in the sleeve 54 is less than half the diameter of the ball. The line of contact D between the ball and the recess 52 in the impeller hub 50 remains unaltered at the maximum value equal to approximately the full diameter of the ball 58.

This ability to obtain a speed step-up of greater than 2:1 is advantageous in a supercharger drive as the increased supercharger speed at low engine speeds substantially improves the effectiveness of the supercharger on the engine performance.

Figure 1:
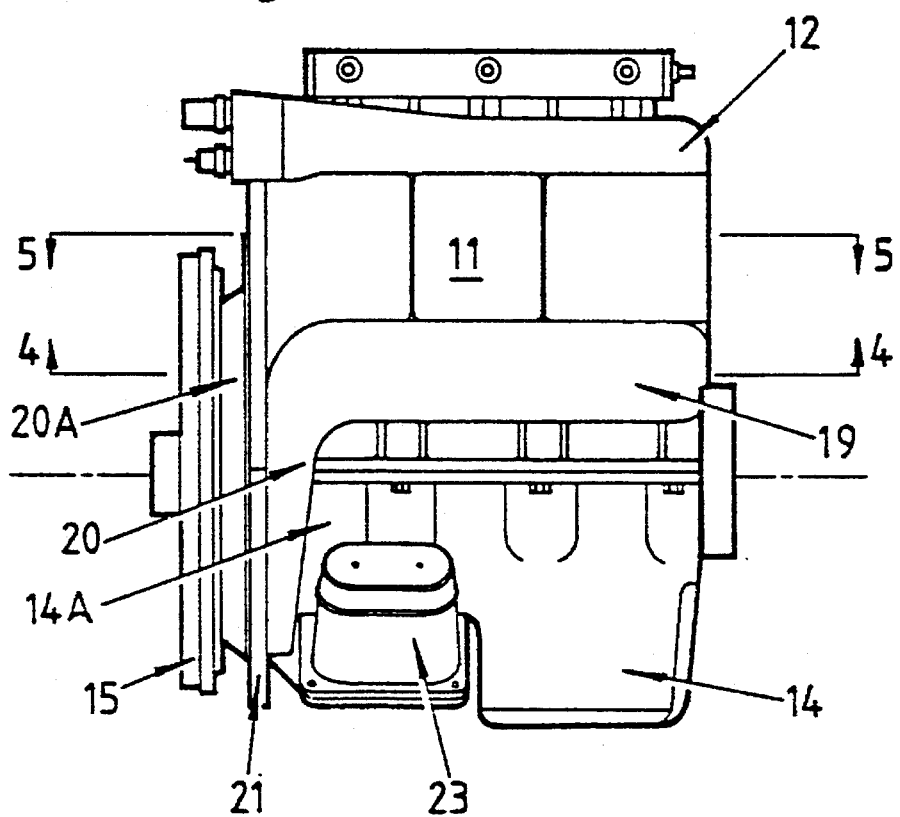
FIG. 1 is a side view of the engine.
Figure 4:
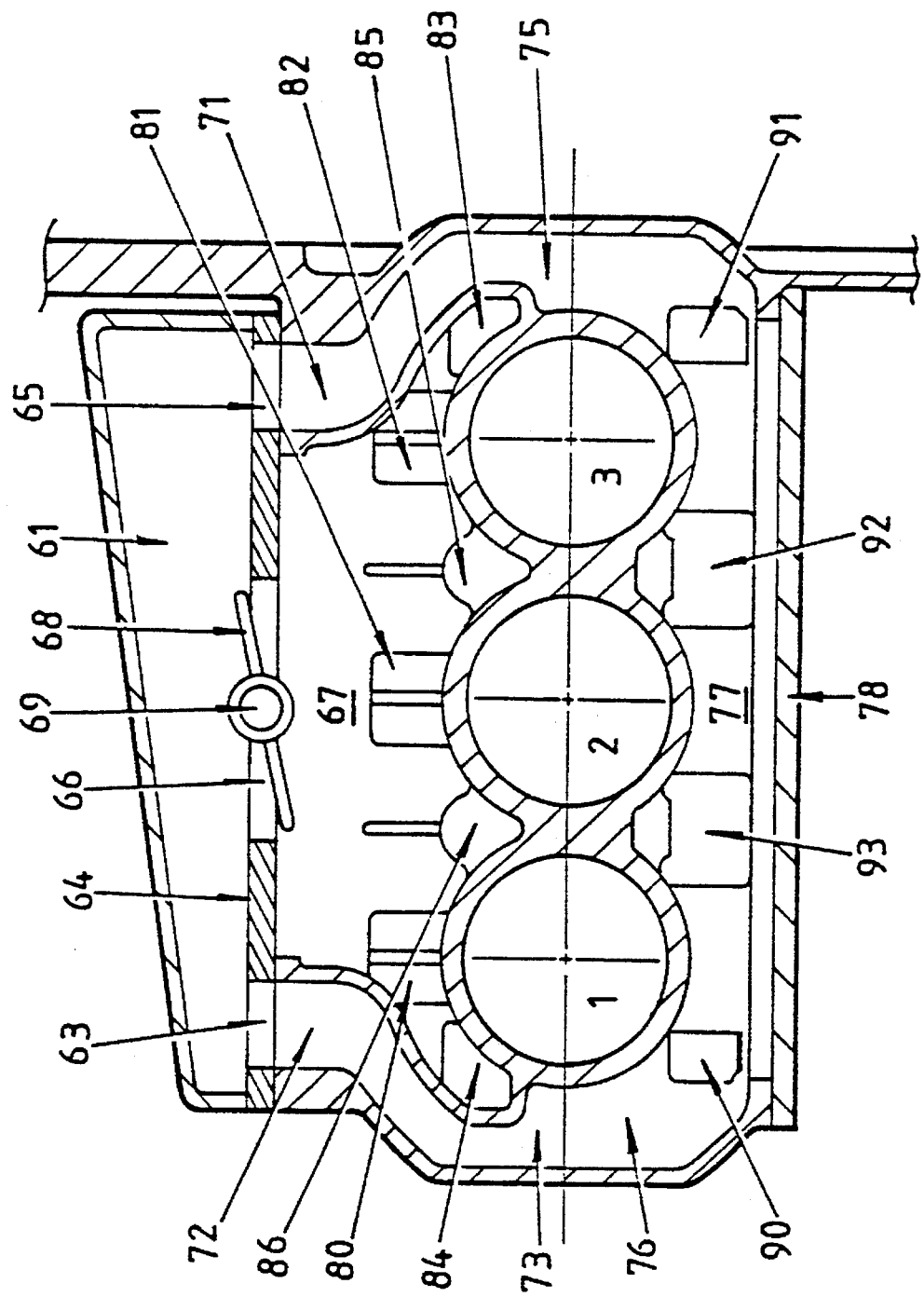
FIG. 4 is a sectional view of the cylinder block along the line 4—4 in FIG. 1.

Referring now to FIG. 4 of the drawings, there is shown a cross-sectional view of the engine shown in FIGS. 1 and 2 along the line 4—4 in FIG. 1, and with the supercharger omitted for the purpose of simplicity. As can be seen from FIG. 1, this cross-sectional view along the line 4—4 is low on the engine block and below the level of the inlet and exhaust ports of the cylinders, which shall be referred to further in connection with FIG. 5 of the drawings.

The air delivery duct 19 from the supercharger enters the plenum chamber 61 which extends substantially the length of the engine. The plenum chamber is an independent component from the engine block, and is secured thereto by appropriate mounting bolts. Interposed between the plenum chamber 61 and the cylinder block is a baffle plate 64 having three apertures 63, 65 and 66 therethrough which provide the only communication between the plenum chamber 61 and the interior of the cylinder block.

The central aperture 66 in the baffle plate 64 is the only direct communication between the plenum chamber 61 and the gallery 67 in the cylinder block. The plate-type valve 68 is mounted centrally of the aperture 66 on a spindle 69 so that the flow of air from the plenum chamber 61 to the gallery 67 in the cylinder block may be controlled and if desired, completely terminated. The end apertures 65 and 63 in the baffle plate 64 align with the respective ends 71 and 72 of the loop passage 73 formed in the cylinder block. The passage 73 passes across the block at each end thereof as indicated at 75 and 76 communicating with the respective ends of a gallery 77 running the full length of the cylinder block on the other side of the engine and closed on the outer side by the cover plate 78.

Extending from the galleries 67 and 77 are a plurality of transfer passages which communicate the various air inlet ports of the engine cylinders with the respective galleries. The gallery 67 communicates with each of the three pairs of rear transfer passages 80, 81 and 82, which communicate with the respective rear inlet ports of each of the cylinders of the engine. At each end, the gallery 67 communicates with auxilliary passages 83 and 84, which communicate with the outer auxilliary port of the respective end cylinders 3 and 1 of the engine. In the area between the respective adjacent cylinders there is further provided auxilliary transfer passages 85 and 86, each of which communicates with two auxilliary ports, one in each of the two adjacent cylinders, as described in more detail hereinafter.

The other gallery 77 located on the opposite side of the engine block, this being the side on which the exhaust ports are also located, has two end inlet transfer passages 90 and 91 communicating with the respective inlet ports in the end cylinders 1 and 3, and between the adjacent pairs of cylinders 3,2 and 2,1 there are provided two further inlet transfer passages 92 and 93, each supplying air to two inlet ports, one provided in each of the two adjacent cylinders.

It can be readily seen, from a consideration of the above described air distribution passages, when the control valve 68 is in the closed position, no air is supplied to the air gallery 67 and accordingly no air is provided to the inlet ports in the engine which communicate with the inlet transfer passages 80, 81, 82, 83, 84, 85 and 86. However, air is supplied through the passages 75 and 76 to the air gallery 77, from which air is then supplied to the inlet ports associated with inlet transfer passages 90, 91, 92 and 93. It has been found beneficial to operate the engine with air supplied to the restricted number of inlet ports of the engine in order to obtain appropriate combustion conditions in the cylinders under light loads.

It will be appreciated that in order to obtain the desired control over the air flow to the ports on the respective opposite sides of the cylinder block by the use of the passage 73, and to supply air to the inlet ports of two adjacent cylinders by a single transfer passage, it is necessary for the crankcase to be of a construction such that it will co-operate with the lower face of the cylinder block to provide an uninterrupted seal between the crankcase and the air supply system of the engine including the air galleries 67 and 77, and a seal between the respective air galleries 67 and 77.

Figure 5:
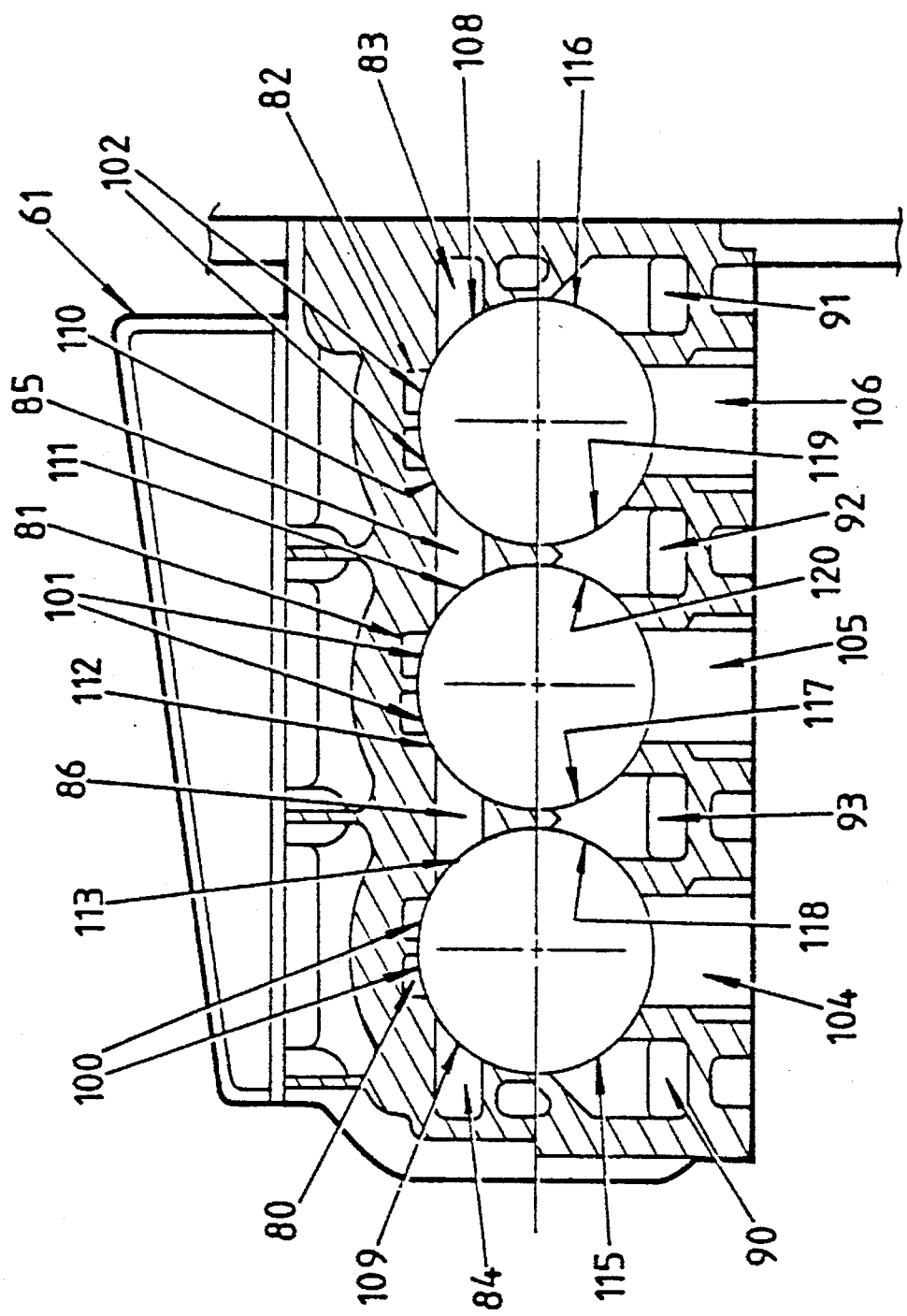
FIG. 5 is a sectional view of the cylinder block along the line 5—5 in FIG. 1.

Referring now to FIG. 5 of the drawings, this is a cross-sectional view through the cylinder block at the level of the various inlet and exhaust ports to the respective cylinders. The inlet and outlet ports are opened and closed by the piston reciprocating in the cylinder in the conventional manner.

The twin transfer passages 80, 81 and 82 supply air to the respective pairs of rear inlet ports 100, 101 and 102, these ports being diagonally opposite the exhaust ports 104, 105 and 106 in the corresponding cylinders. The outer auxilliary transfer passages 83 and 84 provide air to the auxilliary ports 108 and 109 of the respective end cylinders 3 and 1 of the cylinder block and the inner auxilliary transfer passages 85 and 86 supply air respectively to the pair of ports 110 and 111 and the pair of ports 112 and 113.

The transfer passages 90, 91, 92 and 93 each communicate with gallery 77, and the end transfer passages 90 and 91 communicate with the outer inlet ports 115 and 116 of the respective end cylinders 1 and 3 while the central transfer passages 93 and 92 communicate respectively with the paired inlet ports 117, 118 and 119, 120, respectively.

The supplying of air to respective inlet ports of adjacent cylinders in a multi-cylinder two stroke cycle engine from a single transfer port has not previously been practised. However, it has been found to be practical in a supercharged engine, wherein the compression pressure conventionally developed in the crankcase section relating to each cylinder is not required to effect transfer of the air into the cylinder. However, where the engine is supercharged a continuous supply of compressed air is available to the ports without reliance upon crankcase compression which cycles with the reciprocation of the piston.

In this regard, it will be appreciated that by providing a single transfer passage servicing the adjacent inlet ports of two adjacent cylinders, the cross-sectional area of the single transfer passage can be made greater than would be possible if two independent passages were provided in the same space between to service the inlet ports of the respective cylinders. Accordingly, a benefit is achieved by making the single transfer passage larger in cross-section than one of the two passages normally used, and yet less than the total cross-section of the two passages it replaces. In this way, the benefits of a less restrictive passage for the air flow can be obtained while also reducing the overall length of the engine. Accordingly, a dual benefit is obtained, whereas in previous engines a benefit in one area could only be achieved with a detrimental effect in the other area.

When adjacent inlet ports of adjacent cylinders have a common transfer passage as discussed above, it is necessary that the timing of the opening and closing of the inlet ports of adjacent cylinders be arranged so that only one of the inlet ports is open to receive air from the common transfer passage at any one time. This arrangement ensures that the cylinders having inlet ports receiving air from a common transfer passage each receiving the required amount of air.

If both of the ports were open at the same time, conditions may exist that would result in an uneven air distribution between the two inlet ports supplied from the common transfer passage. Also as the direction of the air flow through the inlet ports is usually important in achieving scavenging of the cylinder, it is preferable for the piston of one cylinder to close the inlet port thereof while the other inlet port receiving air from the same transfer port is open. The portion of the piston closing the one inlet port provides part of the surface of the transfer passage guiding the air flow to the cylinder with the open inlet port.

Figure 7:
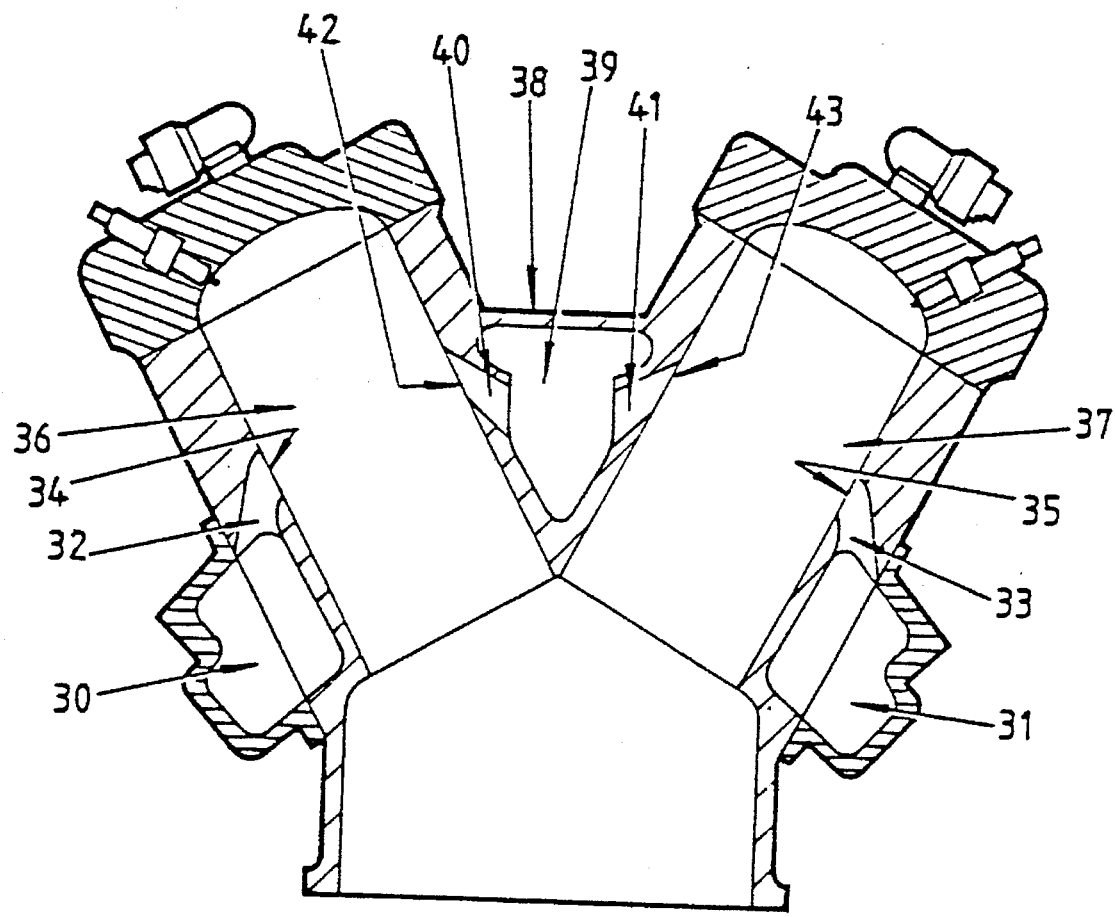
FIG. 7 is a simplified transverse cross-sectional view of a multi-cylinder V engine, incorporating the air distribution system of the invention.

Referring now to FIG. 7 of the drawings, there is shown in simplified form a tranverse cross-sectional view of a multi-cylinder engine with cylinders arranged in a 60° V formation providing two banks of inline cylinders. The engine operates on the two-stroke cycle, preferably with direct fuel injection to the respective cylinders.

The engine is provided with three air conduits receiving air from a supercharger, conveniently of the configuration previously described with reference to FIG. 3. The three conduits comprise conduits 30 and 31 located low down on the cylinders on either side of the block. The respective conduits 30 and 31 each run substantially the length of the block so as to be able to provide air to all of the inlet ports located on the respective outer sides of the cylinder banks where the exhaust ports are also located. Conveniently, the conduits 30 and 31 may be interconnected across the engine block at the forward and/or rear end thereof (not shown) so that there are balanced conditions between the air in the respective conduits 30 and 31.

The conduits 30 and 31 communicate with respective transfer passages 32 and 33 formed in the wall of the cylinders in each bank to deliver air from the conduits through the respective inlet ports 34 and 35 to the respective cylinders 36 and 37.

The wall 38 bridges between the cylinders in the respective banks of the V formation to form a central air conduit 39 running the length of the engine block and communicating via respective transfer passages 40 and 41 with ports 42 and 43 in the cylinders 36 and 37 in the respective banks. The conduit 39 formed within the V also receives air from the same supercharger unit as that which provides the air to the conduits 30 and 31. In one form of the engine, the conduits 30 and 31 each communicates at the opposite end of the engine and with the central passage 39, conveniently at the delivery port of the supercharger.

The conduits 30 and 31 may be isolated from the conduit 39 other than the communication arising from all three passages receiving their air supply from the same supercharger. Further in such a construction a control valve may be provided so that conduit 39 can be isolated from the supercharger, whereby air is only delivered to the conduits 30 and 31. Further the valve may be of a construction whereby the rate of supply of air to the conduit 39 can be regulated. If desired the control valve may operate on the conduits 30 and 31 and the central conduit 39 is in direct communication with the supercharger.

The control of the air supply to the passages 30, 31 and 39 in either of the above manners may be used to assist in the control of the combustion and scavenging process to thereby provide management over the level of exhaust emissions. In particular, under low load conditions it is appropriate to provide air supply only to the conduits 30 and 31.

A detailed description of the porting and transfer passages has not been provided as this is readily understood from the previous description of the single bank of inline cylinders as shown in FIGS. 1, 2, 4 and 5. The V engine configuration is basically two single banks with a common crankshaft and crankcase. In the engine shown in FIG. 7 the conduits 30 and 31 each correspond to gallery 77 in FIG. 4 and the conduit 39 corresponds to gallery 67.

In reference to the control of the air flow to the respective galleries or conduits as previously described, this may be achieved by a valve element, such as by the valve 68, this may be by mechanical actuation from the engine throttle valve or under the control of an electronic engine management system as currently used widely in vehicle engines.

We claim:

1. A multi-cylinder two stroke cycle internal combustion engine comprising a cylinder block (11) and a plurality of cylinders (1,2,3) in said cylinder block arranged in at least one bank, each bank having a plurality of in-line cylinders (1,2,3), a crankshaft (13) having a longitudinal axis, a piston supported to reciprocate in each cylinder, each piston being coupled to the crank shaft to effect rotation of the crank shaft in response to reciprocation of the pistons, a supercharger located at one end of the cylinder block (11) co-axial with the crankshaft (13), said supercharger having a stationary housing (20) non-rotatably secured to the cylinder block (11) and an impeller (26) co-axial with and drive coupled to the crankshaft (13), each cylinder (1,2,3) in at least one cylinder bank having at least two inlet ports (100, 115, 101, 117, 102, 119) one on each side of a longitudinal axis of the respective bank of cylinders (1,2,3) and a respective air gallery (67,77) extending along each of said two sides of said at least one bank of cylinders (1,2,3), each air gallery (67,77) being arranged to receive air from the supercharger, the inlet ports (100, 115, 101, 117, 102, 119) on the respective side of said cylinder bank being in direct communication only with the air gallery (67,77) on that side of the cylinder bank, and air supply control means (68) provided between the supercharger and one said air gallery of each cylinder bank to selectively control the rate of supply of air from the supercharger to each air gallery (67) of each cylinder bank, characterized by having in the wall of each cylinder (1,2,3) an exhaust port (104,105,106), all exhaust ports (104,105, 106) in each cylinder bank being located on the one side of the cylinder bank, each cylinder (1,2,3) in the cylinder bank having at least one inlet port (115,117,119) in the cylinder wall on the same side of said cylinder bank as the exhaust ports, said inlet ports (115,117,119) on the exhaust port side of the cylinder bank all being in direct communication with the air gallery (77) extending along the same side of the cylinder bank as the side where the exhaust ports (104,105, 106) are located.

2. A multi-cylinder internal combustion engine as claimed in claim 1, wherein each cylinder (1,2,3) in the cylinder bank has two inlet ports (115,118,117,120,119,116) in the cylinder wall on the same side as the exhaust port (104,105,106) is located, said two inlet ports (115,118,117,120,119,116) being arranged one on each of the two opposite sides of the exhaust port (104,105,106) in the longitudinal direction of the cylinder bank.

3. A multi-cylinder internal combustion engine as claimed in claim 1, wherein said air supply control means (68) is adapted to selectively isolate the air supply from the supercharger to the air gallery (67) on the side of the cylinder bank opposite to the exhaust ports.

4. A multi-cylinder internal combustion engine as claimed in claim 2, wherein said air supply control means (68) is adapted to selectively isolate the air supply from the supercharger to the air gallery on the opposite side of the cylinder bank to the exhaust ports.

5. A multi-cylinder internal combustion engine as claimed in any one of claim 1, 2, 3 and 4, wherein the rate of supply of air from the supercharger to one said air gallery of each cylinder bank is controlled independently of the rate of supply of air to the other air gallery.

6. A multi-cylinder internal combustion engine as claimed in any one of claims 1, 2, 3 and 4, having two banks of cylinders arranged in a V formation, wherein each bank has an air gallery (30, 31) extending along the outer side thereof and a single air gallery (39) is provided between the banks and communicating with the inlet ports (42,43) on the inner side of each bank.

7. A multi-cylinder internal combustion engine as claimed in claim 6 having two banks of cylinders arranged in a V formation, wherein each bank has an air gallery extending along the outer side thereof and a single air gallery is provided between the banks communicating with the inlet ports on the inner side of each bank.

8. A multi cylinder internal combustion engine comprising a cylinder block (11) and a plurality of cylinders (1,2,3) in said cylinder block arranged in at least one bank, each bank having a plurality of in-line cylinders (1,2,3), a crankshaft having a longitudinal axis, a piston supported to reciprocate in each cylinder, each piston being coupled to the crankshaft to effect rotation of the crankshaft in response to reciprocation of the pistons, a supercharger located at one end of the cylinder block (11) co-axial with the crankshaft (13), said supercharger having a stationary housing (20) non-rotatably secured to the cylinder block (11) and an impeller (26) co-axial with and drive coupled to the crankshaft (13), each cylinder (1,2,3) in at least one cylinder bank having at least two inlet ports (100,115,101,117,102,119) one on each side of a longitudinal axis of the respective bank of cylinders (1,2,3) and a respective air gallery (67,77) extending along each of said two sides of said at least one bank of cylinders (1,2,3), each air gallery (67,77) being arranged to receive air from the supercharger, the inlet ports (100,115,101,117,102,119) on the respective side of said cylinder bank being in direct communication only with the air gallery (67,77) on that side of the cylinder bank, and air supply control means (68) provided between the supercharger and one said air gallery of each cylinder bank to selectively control the rate of supply of air from the supercharger to each air gallery (66,67) of each cylinder bank, wherein said engine has two banks of cylinders arranged in a V formation, each bank has an air gallery (30,31) extending along the outer side thereof and a single air gallery (39) is provided between the banks and communicating with the inlet ports (42,43) on the inner side of each bank.

9. A multi cylinder internal combustion engine as claimed in claim 8 wherein the supercharger is interposed between the engine cylinder block (11) and flywheel (15) mounted on the crankshaft (13).

10. A multi cylinder internal combustion engine as claimed in claim 8 including transmission means (27) to drive couple the impeller (26) of the supercharger to the crankshaft (13), the transmission means (27) being adapted to rotate the impeller (26) at a rotation speed greater than the crankshaft (13).

11. A multi cylinder internal combustion engine as claimed in claim 8 wherein at least part of the stationary housing (20) of the supercharger is integral with the cylinder block ( 11 ) .

12. A multi cylinder internal combustion engine as claimed in claim 9 wherein at least part of the stationary housing (20) of the supercharger is integral with the cylinder block (11).

13. A multi cylinder internal combustion engine as claimed in claim 6 wherein at least part of the stationary housing (20) of the supercharger is integral with the cylinder block (11).

14. A multi cylinder internal combustion engine comprising a cylinder block (11) and a plurality of cylinders (1, 2, 3) in said cylinder block arranged in at least one bank, each bank having a plurality of in-line cylinders (1,2,3), a crankshaft having a longitudinal axis, a piston supported to reciprocate in each cylinder, each piston being coupled to the crankshaft to effect rotation of the crankshaft in response to reciprocation of the pistons, a supercharger located at one end of the cylinder block (11) co-axial with the crankshaft (13), said supercharger having a stationary housing (20) non-rotatably secured to the cylinder block (11) and an impeller (26) co-axial with and drive coupled to the crankshaft (13), each cylinder (1,2,3) in at least one cylinder bank having at least two inlet ports (100,115,1010, 117,102,119) one on each side of a longitudinal axis of the respective bank of cylinders (1,2,3), an exhaust port (104,105,106) and a respective air gallery (67,77) extending along each of said two sides of said at least one bank of cylinders (1,2,3), each air gallery (67,77) being arranged to receive air from the supercharger, the inlet ports (100,115,101, 117,102,119) on the respective side of said cylinder bank being in direct communication only with the air gallery (67,77) on that side of the cylinder bank, and air supply control means (68) provided between the supercharger and one said air gallery of each cylinder bank to selectively control the rate of supply of air from the supercharger to each air gallery (66,67) of each cylinder bank.

15. A multi cylinder internal combustion engine comprising a cylinder block (11) and a plurality of cylinders (1,2,3) in said cylinder block arranged in at least one bank, each bank having a plurality of in-line cylinders (1,2,3), a crankshaft having a longitudinal axis, a piston supported to reciprocate in each cylinder, each piston being coupled to the crankshaft to effect rotation of the crankshaft in response to reciprocation of the pistons, a supercharger located at one end of the cylinder block (11) co-axial with the crankshaft (13), said supercharger having a stationary housing (20) non-rotatably secured to the cylinder block (11) and an impeller (26) co-axial with and drive coupled to the crankshaft (13), each cylinder (1,2,3) in at least one cylinder bank having at least two inlet ports (100,115,101,117, 102,119) one on each side of a longitudinal axis of the respective bank of cylinders (1,2,3), an exhaust port (104,105,106) and a respective air gallery (67,77) extending along each of said two sides of said at least one bank of cylinders (1,2,3), each air gallery (67,77) being arranged to receive air from the supercharger, the inlet ports (100,115,101,117,102,119) on the respective side of said cylinder bank being in direct communication only with the air gallery (66,77) on that side of the cylinder bank, and air supply control means (68) provided between the supercharger and one said air gallery of each cylinder bank to selectively control the rate of supply of air from the supercharger to each air gallery (66,67) of each cylinder bank, wherein said engine has two banks of cylinders arranged in a V formation, each bank has an air gallery (30,31) extending along the outer side thereof and a single air gallery (39) is provided between the banks and communicating with the inlet ports (42,43) on the inner side of each bank.

16. A multi cylinder internal combustion engine comprising a cylinder block (11) and a plurality of cylinders (1,2,3) in said cylinder block arranged in at least one bank, each bank having a plurality of in-line cylinders (1,2,3), a crankshaft having a longitudinal axis, a piston supported to reciprocate in each cylinder, each piston being coupled to the crankshaft to effect rotation of the crankshaft in response to reciprocation of the pistons, a supercharger located at one end of the cylinder block (11) co-axial with the crankshaft (13), said supercharger having a stationary housing (20) non-rotatably secured to the cylinder block (11) and an impeller (26) co-axial with and drive coupled to the crankshaft (13), each cylinder (1,2,3) in at least one cylinder bank having at least two inlet ports (100, 115,1010, 117,102,119) one on each side of a longitudinal axis of the respective bank of cylinders (1,2,3), an exhaust port (104,105,106) and a respective air gallery (67,77) extending along each of said two sides of said at least one bank of cylinders (1,2,3), each air gallery (67,77) being arranged to receive supercharged air from the supercharger, during supercharging of the engine, the inlet ports (100,115,101,117,102,119) on the respective side of said cylinder bank being in direct communication only with the air gallery (67,77) on that side of the cylinder bank, and air supply control means (68) provided between the supercharger and one said air gallery of each cylinder bank to selectively control the rate of supply of air from the supercharger to each air gallery (67,77) of each cylinder bank.

17. A multi cylinder internal combustion engine as claimed in any one of claims 14 to 16 wherein the supercharger is interposed between the engine cylinder block (11) and flywheel (15) mounted on the crankshaft (13).

18. A multi cylinder internal combustion engine as claimed in any one of claims 14 to 16 including transmission means (27) to drive couple the impeller (26) of the supercharger to the crankshaft (13), the transmission means (27) being adapted to rotate the impeller (26) at a rotation speed greater than the crankshaft (13).

19. A multi cylinder internal combustion engine as claimed in any one of claims 14 to 16 wherein at least part of the stationary housing (20) of the supercharger is integral with the cylinder block (11).

20. A multi cylinder internal combustion engine as claimed in claim 17 wherein at least part of the stationary housing (20) of the supercharger is integral with the cylinder block (11).

21. A multi cylinder internal combustion engine as claimed in claim 18 wherein at least part of the stationary housing (20) of the supercharger is integral with the cylinder block (11).

* * * * *